(12) United States Patent
Brock

(10) Patent No.: US 7,481,096 B2
(45) Date of Patent: Jan. 27, 2009

(54) APPARATUS AND METHOD FOR PROVIDING A TEST TEE

(75) Inventor: Tony Brock, P.O. Box 16771, Asheville, NC (US) 28816

(73) Assignee: Tony Brock, Asheville, NC (US)

( * ) Notice: Subject to any disclaimer, the term of this patent is extended or adjusted under 35 U.S.C. 154(b) by 0 days.

(21) Appl. No.: 11/517,954

(22) Filed: Sep. 8, 2006

(65) Prior Publication Data

US 2007/0056356 A1 Mar. 15, 2007

Related U.S. Application Data

(63) Continuation-in-part of application No. 11/201,769, filed on Aug. 11, 2005, now abandoned.

(60) Provisional application No. 60/695,240, filed on Jun. 29, 2005, provisional application No. 60/682,789, filed on May 19, 2005, provisional application No. 60/600,830, filed on Aug. 11, 2004.

(51) Int. Cl.
*G01M 3/04* (2006.01)
*F16L 55/10* (2006.01)

(52) U.S. Cl. .......................... 73/49.8; 138/90
(58) Field of Classification Search ................ 73/49.8, 73/40.5 R, 49.5; 138/94, 90
See application file for complete search history.

(56) References Cited

U.S. PATENT DOCUMENTS

| | | | | | |
|---|---|---|---|---|---|
| 1,133,714 | A | * | 3/1915 | Elder | 138/90 |
| 1,720,819 | A | * | 7/1929 | Cohen | 138/90 |
| 2,766,614 | A | * | 10/1956 | Cook | 73/46 |
| 4,114,653 | A | * | 9/1978 | Carlin | 138/45 |
| 4,706,482 | A | * | 11/1987 | Barber | 73/49.8 |
| 4,739,799 | A | * | 4/1988 | Carney et al. | 138/89 |
| 5,076,095 | A | * | 12/1991 | Erhardt | 73/49.8 |
| 5,163,480 | A | * | 11/1992 | Huber | 138/94 |
| 5,461,904 | A | * | 10/1995 | Baker | 73/46 |
| 5,740,830 | A | * | 4/1998 | Mankins | 137/15.07 |
| 5,826,609 | A | * | 10/1998 | Watts | 137/15.17 |
| 6,082,183 | A | * | 7/2000 | Huber | 73/49.1 |
| 6,209,584 | B1 | * | 4/2001 | Huber | 138/89 |
| 6,588,454 | B1 | * | 7/2003 | Johnson et al. | 138/90 |
| 6,799,452 | B2 | * | 10/2004 | Brunet et al. | 73/49.8 |
| 2002/0153040 | A1 | * | 10/2002 | Duncan | 137/68.3 |

* cited by examiner

*Primary Examiner*—Michael Cygan

(57) ABSTRACT

The present invention provides a test tee device for leak testing a pipe line system. In structure, the test tee device includes a tee fitting, comprising a tubular section extending between a first and a second opposing openings axially aligned with each other, a third opening communicating with the tubular section of the tee fitting; wherein the tubular section has a inside diameter greater than the first opening inside diameter and the second opening inside diameter.

The present invention can also be viewed as a method for leak testing a pipe line system. The method operates by inserting a test tee fitting, applying a test pressure to the test tee fitting through the third opening; and removing the removable insert, if the test pressure is maintained for the predetermined time.

15 Claims, 10 Drawing Sheets

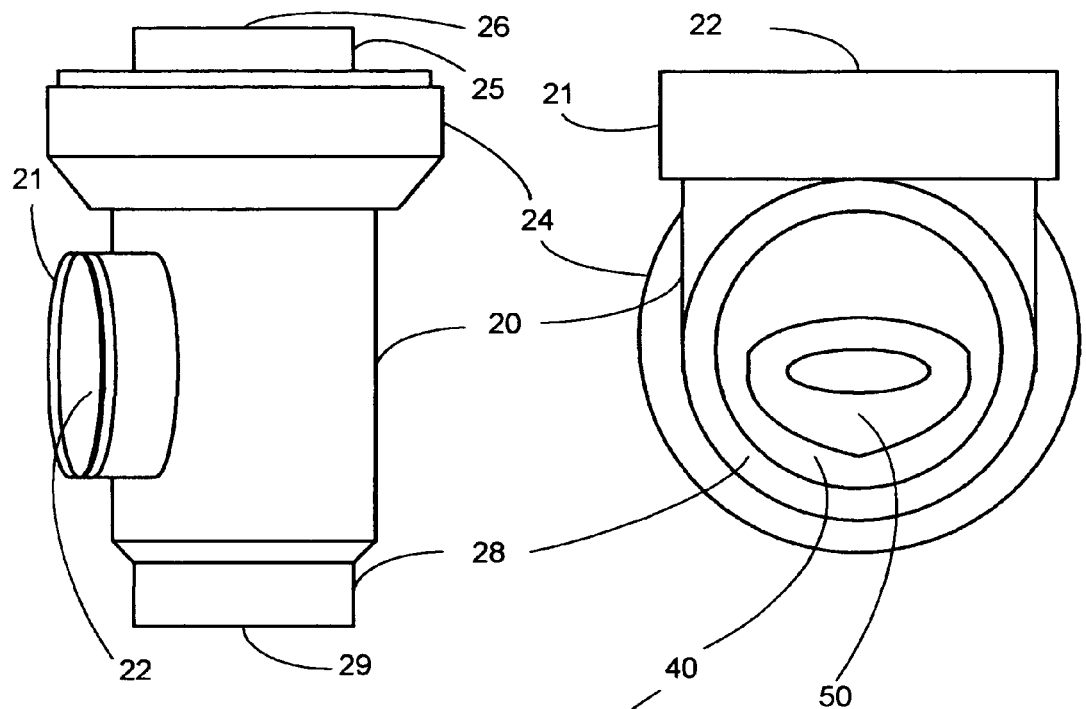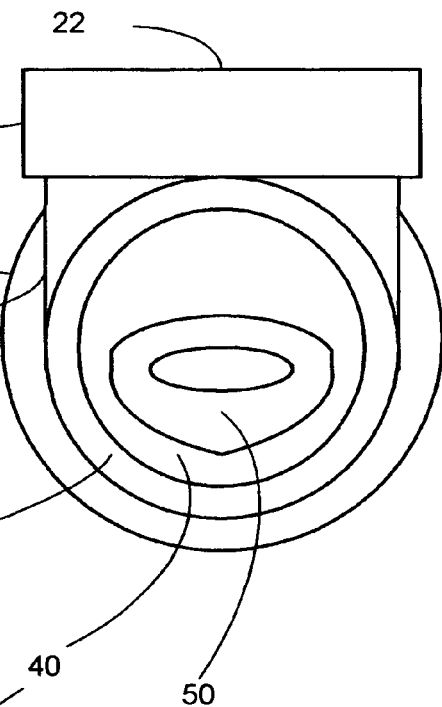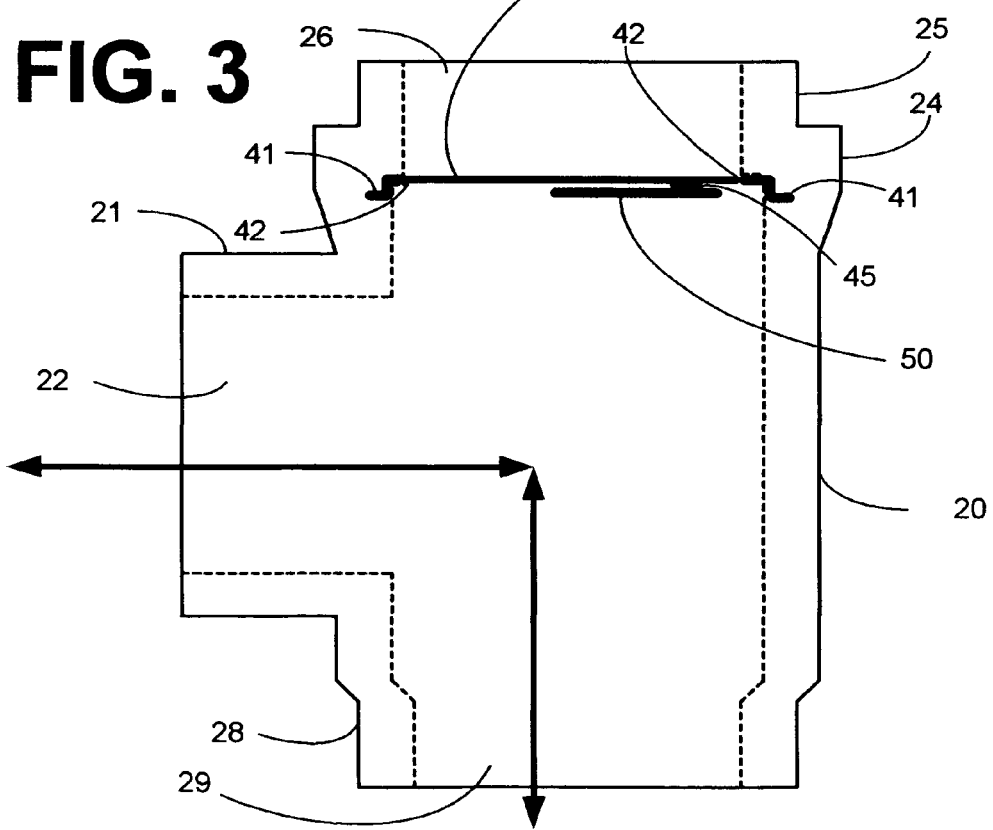

APPARATUS AND METHOD FOR PROVIDING A TEST TEE

CROSS-REFERENCE TO RELATED APPLICATIONS

This application is a continuation-in-part of U.S. application entitled, "Apparatus And Method For Providing A Test Tee", having Ser. No. 11/201,769, filed Aug. 11, 2005 now abandoned and provisional applications Ser. No. 60/600,830, filed on Aug. 11, 2004, entitled "1½", 2", 3" and 4" Street Test Tee with Pop-Top", U.S. Provisional Patent Application Ser. No. 60/682,789, filed on May 19, 2005, entitled "1½", 2", 3" and 4" Street Test Tee with Pop-Top" and U.S. Provisional Patent Application Ser. No. 60/695,240, filed on Jun. 29, 2005, entitled "Tru Test Tee Description", all of which are incorporated by reference herein in their entirety.

TECHNICAL FIELD

The present invention relates to an apparatus and method for providing a test tee, and more particularly, relates to an apparatus and method for testing of newly installed plumbing waste and vent systems that are above and/or below ground.

BACKGROUND OF THE INVENTION

Currently in the United States, testing of new plumbing systems is required by plumbing codes to insure that there are no leaks, bad fittings, bad connections, cracked pipes, etc. The waste and vent system is tested by filling the pipes with water or air. These tests require 5 lbs. or greater PSI (per square inch) of air or 10 feet of head pressure for water. The system must hold this pressure for the length of time determined by local authorities. For example, in Georgia this length of time is approximately 15 minutes.

Test tees are currently installed in plumbing systems where new pipes meet with the existing or previously inspected systems, such as an underground system tied into a city tap. The test tee would be installed between the end of the city tap and the beginning of the new system. This would allow a plug to be placed in the new system side of the tee so the system can be tested. The tee is most often used when the previously inspected underground waste system comes through a concrete slab. It would be connected between the pipes penetrating the slab and the continuation of the above ground system. This would allow a test to be administered from this point and above without retesting the underground system.

The tee fitting is sometimes referred to as a cleanout tee. It is simply a T shaped fitting with a threaded opening for a removable plug. Tee fittings comprise a tubular section extending between a first and a second opposing openings axially aligned with each other; and a third opening communicating with the tubular section of the tee fitting.

When the tee fitting is used in the testing application the plug is removed and a rubber inflatable ball or mechanical compression plug is inserted into the tee on the new side to create a blockage to the waste and vent system so it can be filled with air or water for testing. Once all testing has been completed and the system is functional the threaded plug may be removed, when accessible, and the opening maybe used to cleanout any possible blockage below this point in the future, The problem that often exists with this process is that these rubber test balls sometimes do not hold applied air or water pressure dropping below the code requirement. Improper installation or positioning will not allow for a secure seal and often causes the test to lose pressure. The inflatable test balls are made of natural rubber and have a limited life expectancy causing failure and replacement can be costly. Mechanical plugs have been known to fail if not properly installed and in some instances can crack pipes or fittings.

To find any of these problems in a large system that is being prepared for inspection can be very time consuming especially when testing with air. The failing test device is not always immediately recognizable. Once the problem is located the ball must be reinstalled and re-inflated. If the ball appears faulty, a new ball must be utilized and the system completely retested. This process is very intensive and could be the cause for a failed inspection potentially delaying a project schedule.

Therefore, there is a tremendous need for a true test tee that is sure hold pressure for the length of time determined by local authorities to complete testing of a plumbing system.

SUMMARY OF THE INVENTION

The present invention provides for apparatus and method for providing a test tee, and more particularly, relates to a apparatus and method for testing of newly installed plumbing waste and vent systems that are above and/or below ground The present invention provides a test tee device for leak testing a pipe line system, and more particularly, relates to an apparatus and method for testing of newly installed plumbing waste and vent systems that are above and/or below ground.

In structure, the test tee device includes a tee fitting, comprising a tubular section extending between a first and a second opposing openings axially aligned with each other, a third opening communicating with the tubular section of the tee fitting; wherein the tubular section has a inside diameter greater than the first opening inside diameter and the second opening inside diameter.

The present invention can also be viewed as a method for leak testing a pipe line system. The method operates by (1) inserting a test tee fitting, (2) applying a test pressure to the test tee fitting through the third opening; and (3) removing the removable insert, if the test pressure is maintained for the predetermined time.

BRIEF DESCRIPTION OF THE DRAWINGS

The present invention, as defined in the claims, can be better understood with reference to the following drawings. The components within the drawings are not necessarily to scale relative to each other, emphasis instead being placed upon clearly illustrating the principles of the present invention.

FIG. 2A is a perspective view illustrating an example of the test tee of the present invention.

FIG. 2B is a bottom view illustrating an example of the test tee of the present invention with the pull tab pop-top.

FIG. 3 is a cross-sectional side view illustrating an example of the test tee of the present invention, with the pull tab pop-top as shown in FIG. 2B.

DETAILED DESCRIPTION OF THE PREFERRED EMBODIMENTS

Figure 1A:
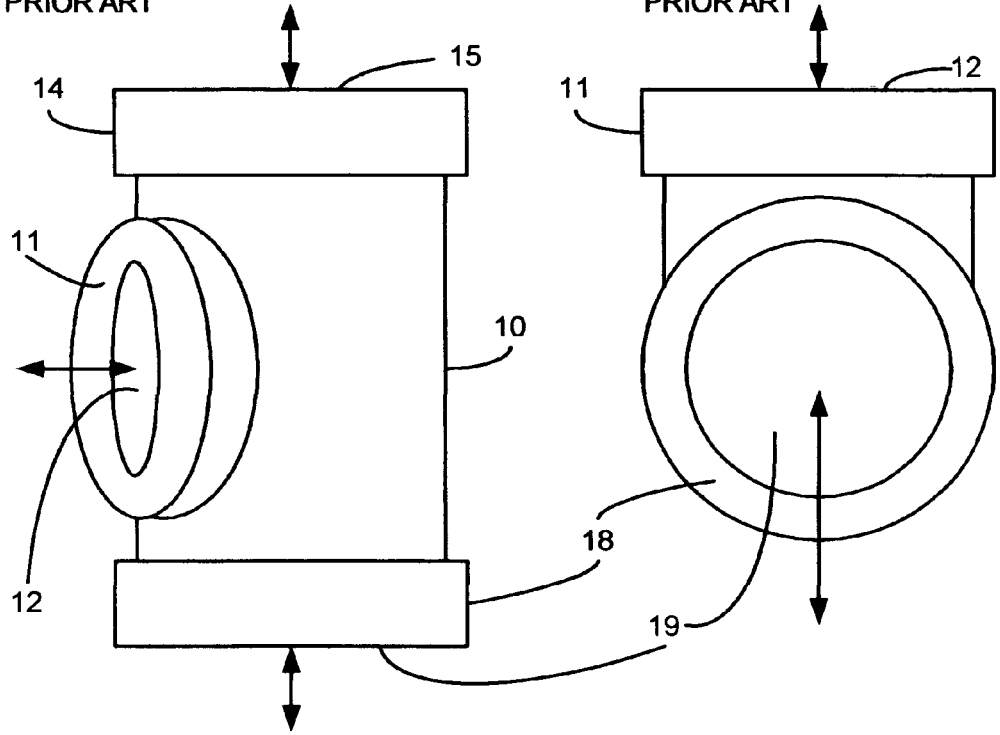
FIG. 1A is a perspective view of a tee fitting of the prior art.

The present invention relates to an apparatus and method for providing a test tee. In particular, relates to an apparatus and method for testing of newly installed plumbing waste and vent systems that are above and/or below ground. Typically these plumbing waste and vent systems utilize 1½", 2", 3" and 4" diameter pipes. However, the invention techniques described herein apply to plumbing piping of all sizes for commercial and residential uses.

The test tee of the present invention utilizes a pull-tab pop top to create blockage for testing purposes. In the preferred embodiment, the pop top is a metallic pop top that is very similar to that of tennis ball or dog food cans. In the preferred embodiment, the pop top is molded into the test tee of the present invention in an angle perpendicular to the flow to create blockage on the newly installed side of the system. This eliminates the need for installation of any other testing equipment. The elimination of other testing equipment reduces cost of material and labor as well as potential retesting costs due to a failure.

In an alternative embodiment, the test tee of the present invention utilizes a removable threaded blockage device to create blockage for test purposes in the test tee. The removable threaded blockage device includes a threaded coller for engaging the internal threads of either or both of the internal first and second opposing openings that are axially aligned with each other in the test tee.

In particular, the test tee of the present invention may be utilized in either a street by street fitting, which means that both ends of the fitting are the same outside dimension of the pipe being used, or a hub by hub fitting, which means a pipe would fit inside the hub of the tee itself, or a combination of the two types consisting of a street by hub fitting. In the preferred embodiment, the test tee is a street by street fitting that can be applied to different material waste and vent systems piping such as but not limited to, copper, cast iron, galvanized pipe, ABS or any other type of piping that can be used with the proper mechanical couplings.

The testing of a plumbing waste or vent system utilizing the test tee of the present invention requires that the threaded plug (not shown) be removed. At that time, a test plug (not shown), which is well-known in the art, is attached to the test tee of the present invention. One type of test plug is illustrated in U.S. Pat. No. 6,912,890 B1. However, it is well-known that there are many types of apparatus used to create a blockade in a test tee to test the plumbing system. The plumbing waste or vent system is then pressurized to verify that the system maintained the air or water pressure without dropping below code requirement. Because the pop top test tee of the present invention virtually eliminates the possibility failure of the test tee, the inspection can be performed without the need for retesting due to equipment failure.

Once the test is complete and the inspections have occurred, the metal pop-top is simply detached and pulled through the threaded opening for disposal. This will leave a clean, smooth finish on the inside of the tee and allow the test tee to remain in the system without causing any interference to the drainage of waste. The threaded plug can now be reinstalled and the test tee can become a cleanout tee if accessible and so desired.

Figure 1C:
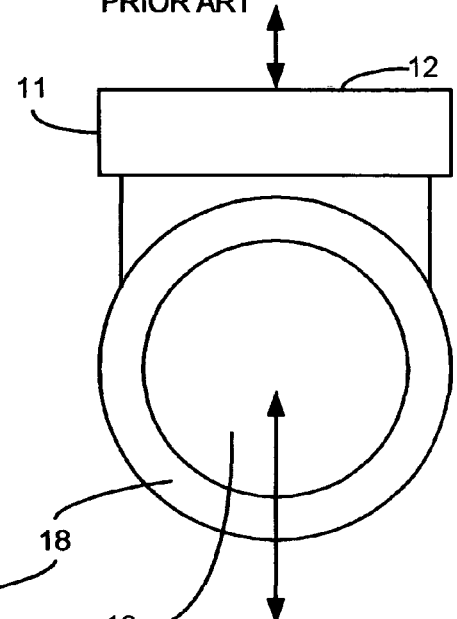
FIG. 1C is a cross-sectional side view of a tee fitting of the prior art.
Figure 1B:
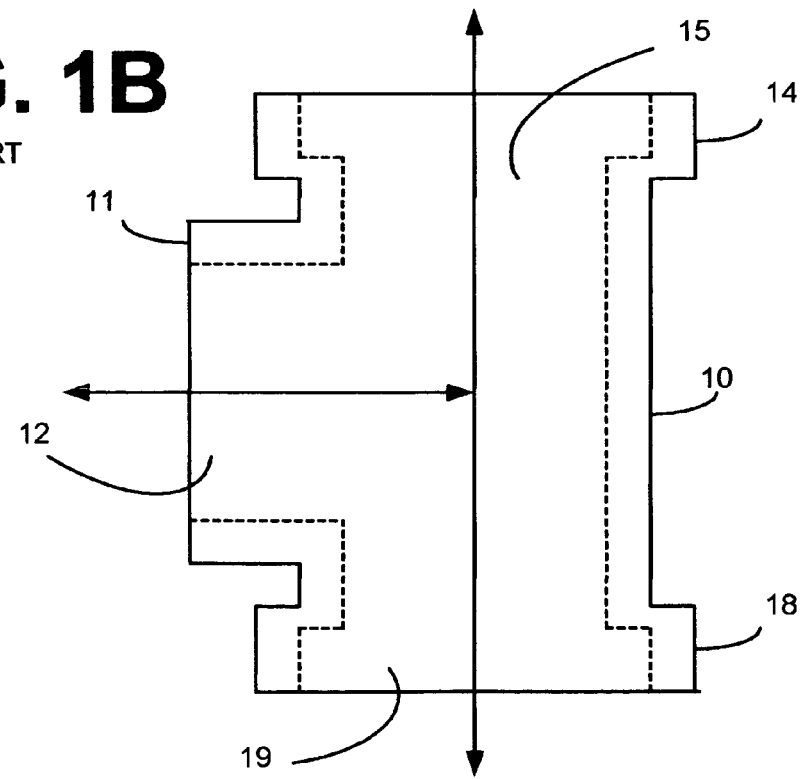
FIG. 1B is a bottom view of a tee fitting of the prior art.

Referring now to the drawings, in which like numerals illustrate like elements throughout the several views, FIG. 1(A-C) illustrates an example of the basic components of a tee fitting of the prior art. Shown is a tee fitting 10 of the prior art, which is sometimes referred to as a cleanout tee. It is simply a T-shaped fitting with a threaded opening 12 for a removable plug (not shown). Tee fitting 10 has hub connectors 14 and 18. Tee fitting 10 also includes the clean out or testing open hub 11 that enables testing equipment or drain cleaning equipment to be inserted through the opening 12. The opening 12 connects openings 15 and 19 in the tee fitting 10.

The test tee of the present invention utilizes a pull-tab pop top to create blockage for testing purposes. As shown in FIG. 2A, an example of the test tee of the present invention is illustrated a perspective view. In the preferred embodiment, a street by street getting is illustrated, however, it is understood that a hub by hub fitting could also be utilized. As shown, test tee 20 of the present invention includes cleanout or testing hub 21 with opening 20 in to the test tee fitting 20 of the present invention. Other openings 26 and 29 are also illustrated with fittings 25 and 29, respectively, on the test tee 20 of the present invention.

FIG. 2B is a bottom view illustrating an example of the test tee 20 of the present invention with the pull tab pop-top 40. The pop top 40 impedes the flow of air or water through the opening 26. This is better illustrated in FIG. 3. FIG. 3 is a cross-sectional side view illustrating an example of the test tee 20 of the present invention, with the pull tab pop-top 40 as shown in FIG. 2B. The pop top 40 is located perpendicular to the flow of either air or water through opening 26.

The pop top 40 comes with a pull-tab 50 to enable a person to remove the pop top 40 from the test tee 20 as required. In the preferred embodiment, the pull-tab 50 is made of the same metallic material as pop top 40. However, it is understood that other materials may be utilized. The pull-tab 50 is attached to the pop top 40 utilizing some attaching means. The attaching means include, but are not limited to, spot welds, rivets, adhesives or the like. In the preferred embodiment, rivets are utilized to attach the pull-tab 50 to pop top 40. In another embodiment, pivot 45 is utilized with pull-tab 50, in order to assist in the removal of the pop top 40.

In order to prevent damage to test tee 20, anchors 41 are utilized with the pop top 40 to anchor the pop top 40 to the test tee 20. Hub section 24 provides the support for anchors 41 so that the pop top 40 may be removed without damage to test tee 20. In the preferred embodiment, anchors 21 utilized the same metallic material of the pop top 40. However, is understood that other materials may provide better anchors and can also be utilized.

In the preferred embodiment, the pop top 40 is stamped or molded with anchors 41. The pull-tab 50 is then attached to pop top 40. As previously mentioned, the preferred embodiment attaches the pull-tab 50 to the pop top 40 utilizing rivets, however, it is understood that other attaching means may be utilized. After pop top 40 is constructed, then the test tee 20 is constructed around of pop top 40. In the preferred embodiment, the test tee 20 is constructed utilizing injection molding techniques.

In another embodiment, optional breakpoints 42 are molded into the pop top fitting 42 assist a person in removing the pop top from the test tee 20.

Figure 4:
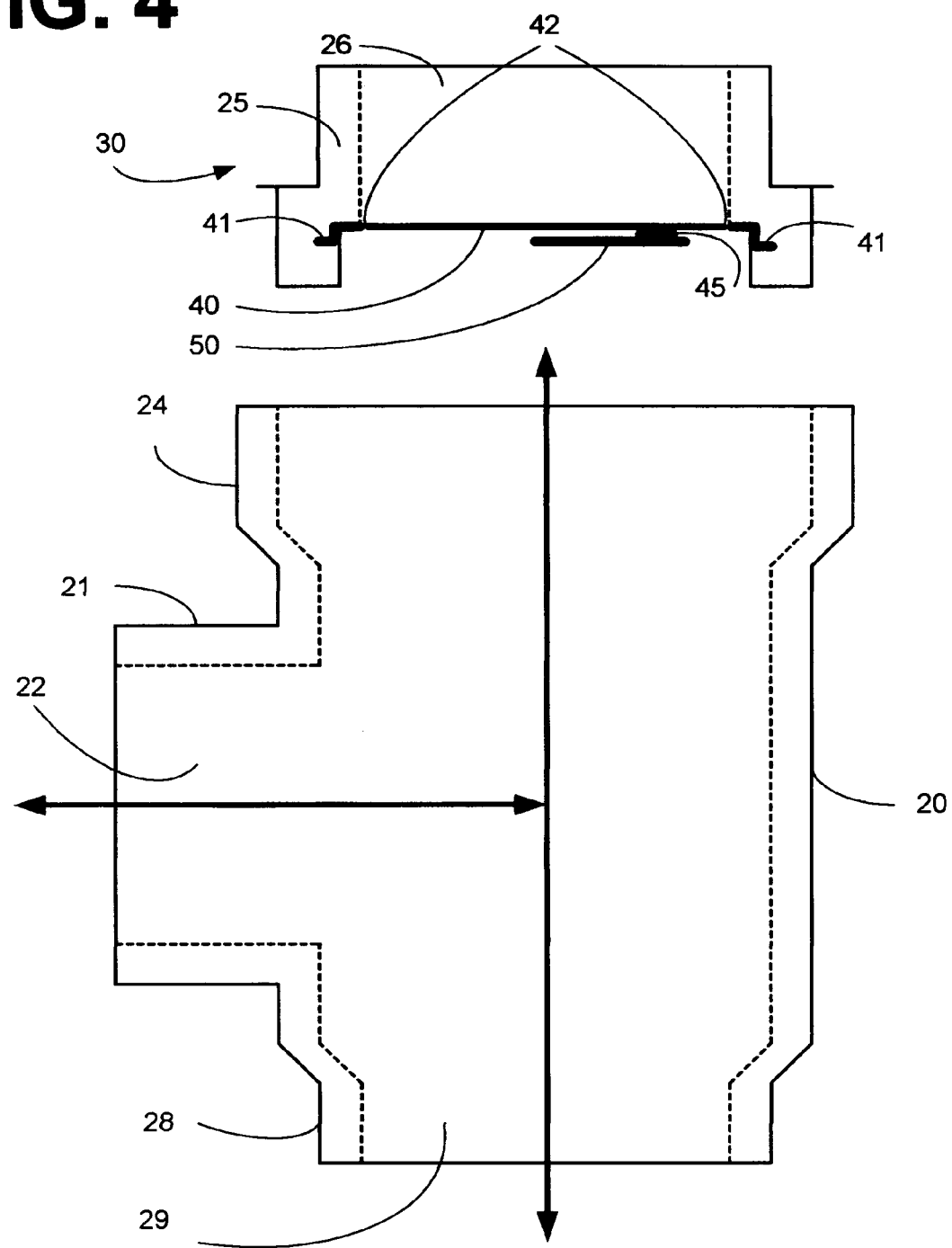
FIG. 4 is a cross-sectional side view of the pop top hub containing the pop top before it is attached to the test tee of the present invention, as shown in FIGS. 2B and 3.

Shown in FIG. 4 is a cross-sectional side view of the pop top hub 30 containing the pop top 40 before it is attached to the test tee 20 of the present invention, as shown in FIGS. 2B and 3. The pop top hub 30 includes the pop top 40 and pull-tab 50 of the present invention.

In the preferred embodiment, the pop top 40 is molded into a polyvinyl chloride (PVC) pop top hub 30 using injection molding techniques. The pop top hub 30 can be constructed from other types of materials such as but not limited to galvanized pipe, cast iron, copper, ABS plastic or the like. Pop top 40 and anchors 41 are generally stamped from a metallic material that is then attached to pull-tab 50. However, it is understood that the pop top 40 is a breakaway insert and could be made with another types of breakaway material, including, but not limited to plastics, rubbers, and malleable metals. These plastics, rubbers and malleable metals include but are not limited to ABS, PVC, other plastics, aluminum, tin, copper, steel, rubber or other known plumbing materials.

After construction of pop top hub 30, the pop top hub 30 is then inserted and attached to test tee 20. The attaching means include, but are not limited to, plastic adhesive, annealing, welding or other like bonding agent. At this time, the test tee 20 with pop top 40 is then ready for installation and usage as described above.

In an alternative embodiment, the test tee 20 by itself without the pop top hub 30 is a unique and very marketable product. The test tee 20 on the present invention features a ½" larger threaded opening than the existing tee design. The diameter of the interior center portion of the test tee 20 is also ½" larger which allows greater accessibility for drain cleaning equipment when the test tee 20 is used for a cleanout. The enlarged portions of the test tee 20 transitions back to the inside pipe dimension at the outlet in a smooth, unobtrusive to flow, angle complying with code requirements.

In the example illustrated, the test tee 20 is shown as street by street tee type plumbing fitting. It should be understood that the same characteristics could be implemented in a hub by hub type tee fitting.

Figure 5A:
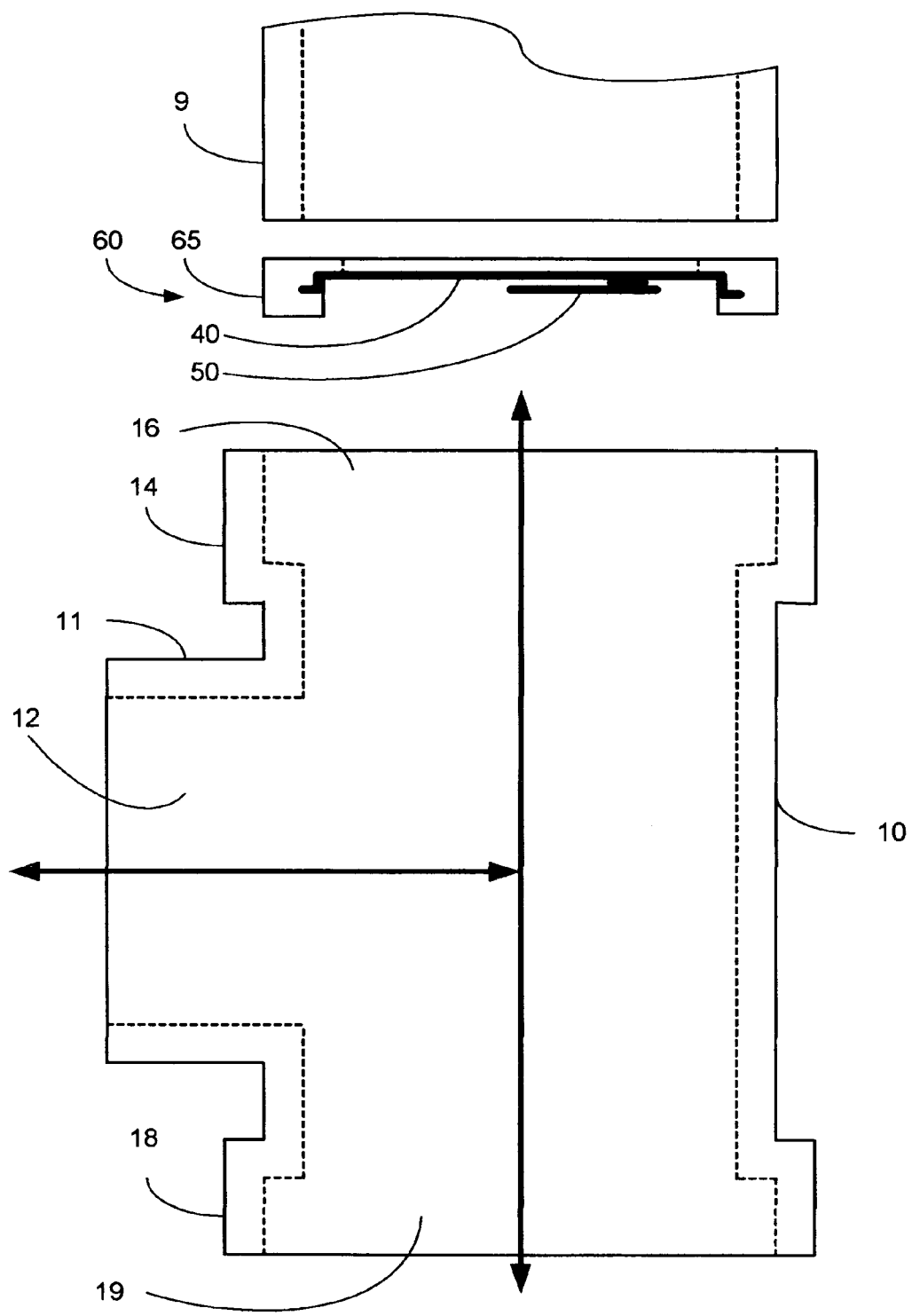
FIG. 5A is a cross-sectional side view illustrating an example of an alternative embodiment of the pull tab pop top of the present invention, with the prior art tee.

FIG. 5A is a cross-sectional side view illustrating an example of an alternative embodiment of the pop top hub 60 of the present invention, with the prior art tee 10. In this embodiment, the pop top hub 60 is configured to fit within a hub 14 of a tee 10 fitting in the prior art. This is done to utilize the pop top 40 of the present invention in prior art tees 10.

The thickness of the pop top hub 60 is significantly reduced from the pop top hub 30 example described with regard to FIG. 4. The thickness of pop top hub 60 is significantly reduced, so it may fit within the hub fitting 14 of tee 10 of the prior art. After the pop top hub 60 is inserted and attached to tee 10, then a pipe 9 may be inserted in tee 10, thereby compressing the pop top hub 60 between tee 10 and the newly inserted pipe 9. This alternative embodiment enables a person to utilize a tee 10 of the prior art with the pop top hub 60 of the present invention.

As shown, pop top hub 60 includes many of the same components as described with regard to FIGS. 2B, 2C, 3, and 4. The pop top hub 60 is manufactured utilizing the same techniques as described above in FIGS. at 3 and 4.

Figure 5B:
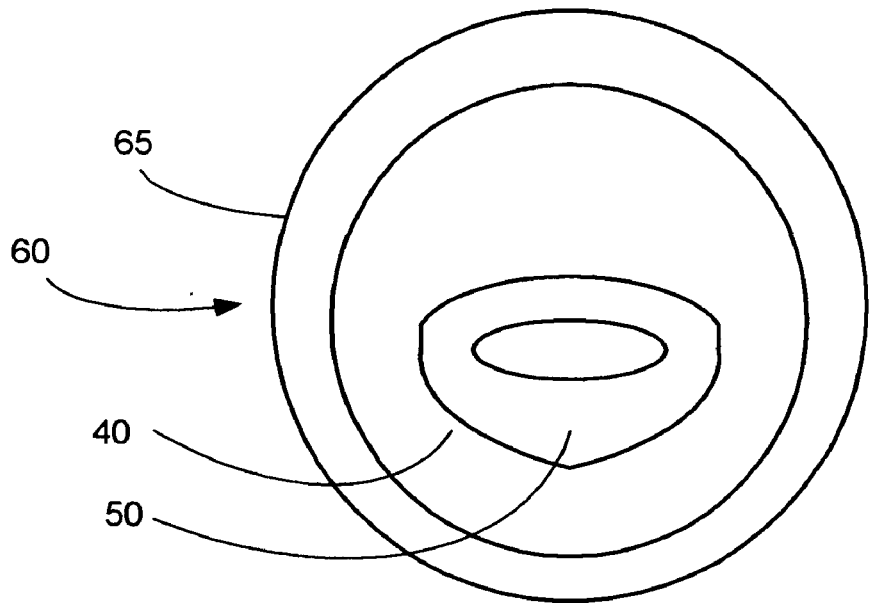
FIG. 5B is a bottom view illustrating an example of an alternative embodiment of the pull tab pop top of the present invention, with the prior art tee.

FIG. 5B is a bottom view illustrating an example of an alternative embodiment of the pop top hub 60 of the present invention, with the prior art tee 10.

Figure 6B:
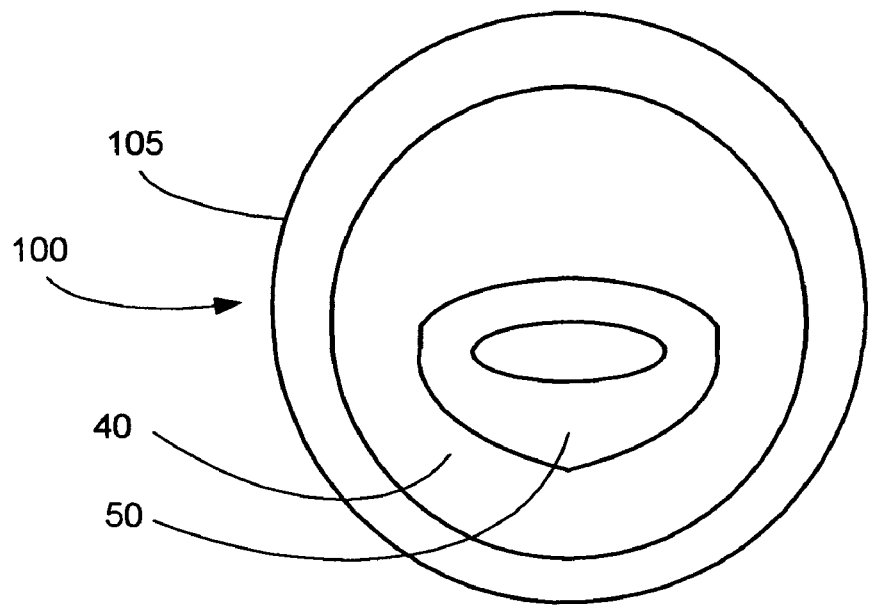
FIG. 6B is a bottom view illustrating an example of an alternative embodiment of the pull tab pop top, with the test tee of the present invention.
Figure 6A:
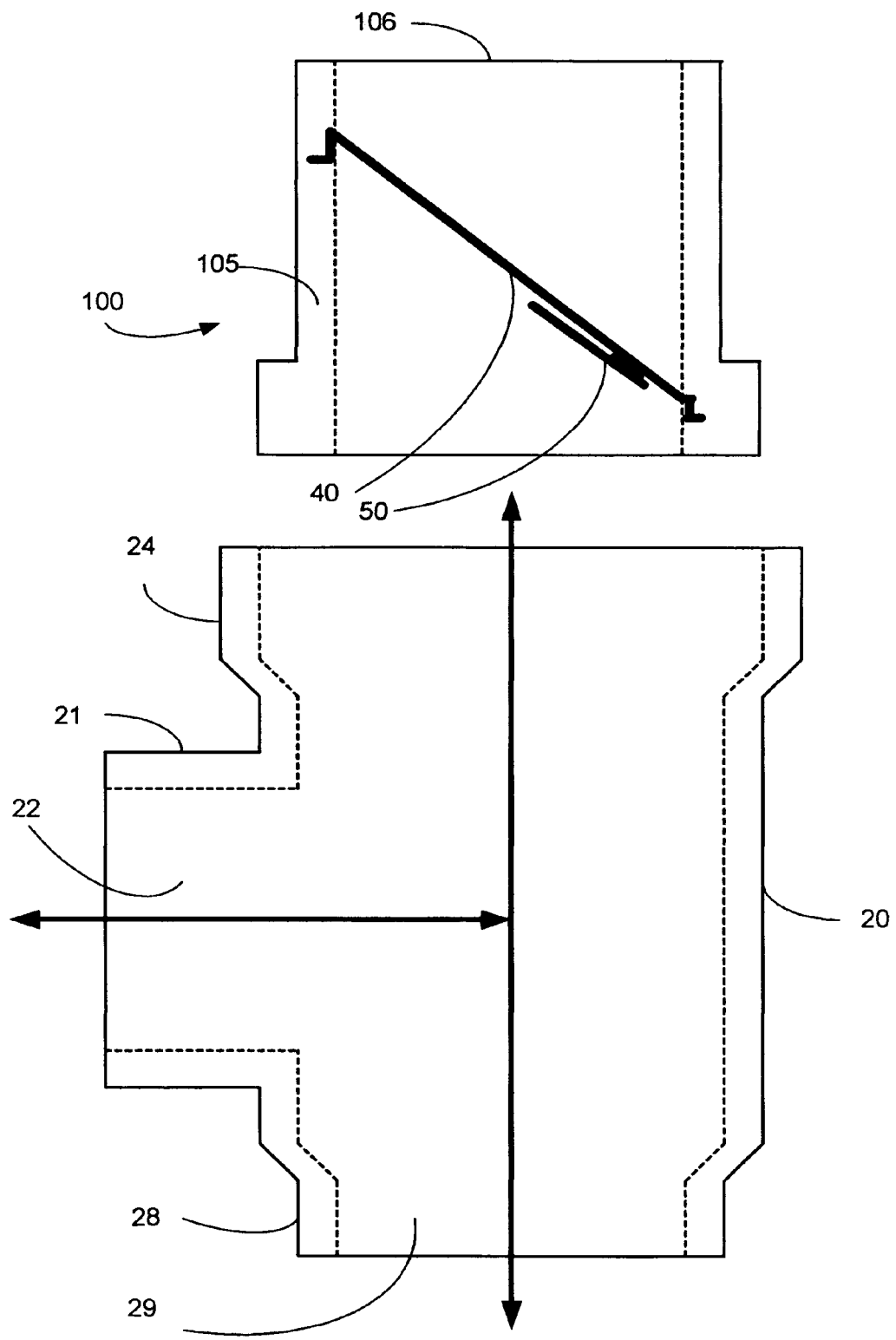
FIG. 6A is a cross-sectional side view illustrating an example of an alternative embodiment of the pull tab pop top, with the test tee of the present invention.

FIG. 6A is a cross-sectional side view illustrating an example of an alternative embodiment of the pop top 40, with the test tee 20 of the present invention. In this alternative embodiment, the pop top 40 is molded in to the pop top hub 100 at an angle 1° to 45°. In this embodiment, the pop top hub 100 is extended in order to accommodate the angle of the pop top 40. The pop top 40 is molded into pop top of 100 in order to make pull-tab 50 is more accessible to a person through opening 20. In this alternative embodiment, the angle is approximately 45°, however, it is understood that angles between zero to 45° may be utilized.

FIG. 6B is a bottom view illustrating an example of an alternative embodiment of the pull tab pop top, with the test tee of the present invention.

In an alternative embodiment, the test tee of the present invention utilizes a removable threaded blockage device to create blockage for test purposes in the test tee. The removable threaded blockage device includes a threaded coller for engaging the internal threads of either or both of the internal first and second opposing openings that are axially aligned with each other in the test tee.

Figure 7A:
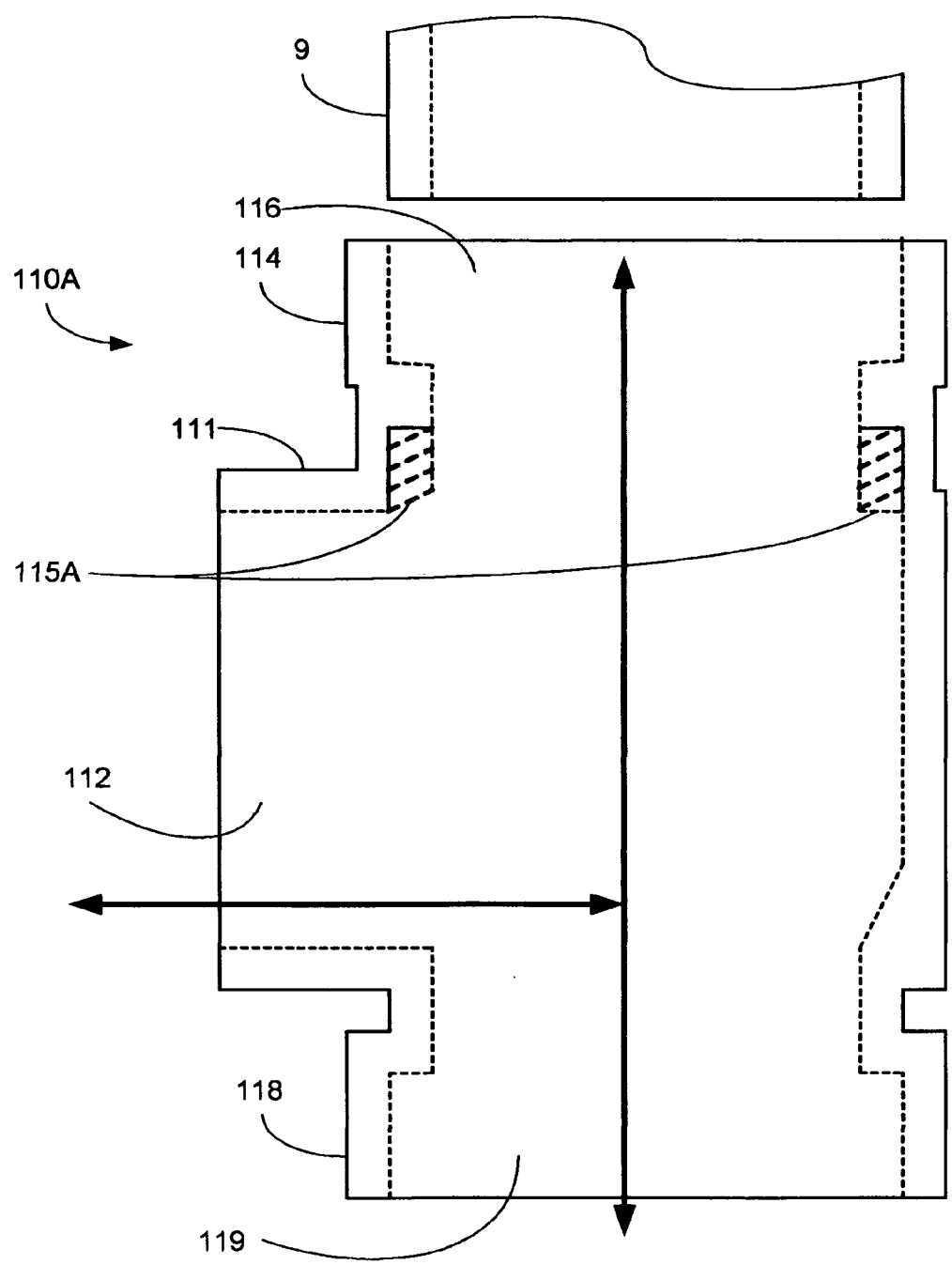
FIG. 7A is a cross-sectional side view illustrating an example of an alternative embodiment of the hub to hub test tee with of the present invention, with internal threads on one of the opposing openings that are axially aligned with each other.

FIG. 7A is a cross-sectional side view illustrating an example of an alternative embodiment of the hub to hub test tee with of the present invention, with internal threads on one of the opposing openings that are axially aligned with each other. In this alternative embodiment, FIG. 7(A-C) illustrates an example of the basic components of a test tee 110 fitting of the present invention. Shown is the test tee fitting 110 (A-C.) are simply a T-shaped fitting with a threaded opening 112 for a removable plug (not shown). Tee fitting 110 has hub connectors 114 and 118. Tee fitting 110 also includes the clean out or testing open hub 111 that enables testing equipment or drain cleaning equipment to be inserted through the opening 112. The opening 112 connects openings 115 and 119 in the tee fitting 110.

Figure 7B:
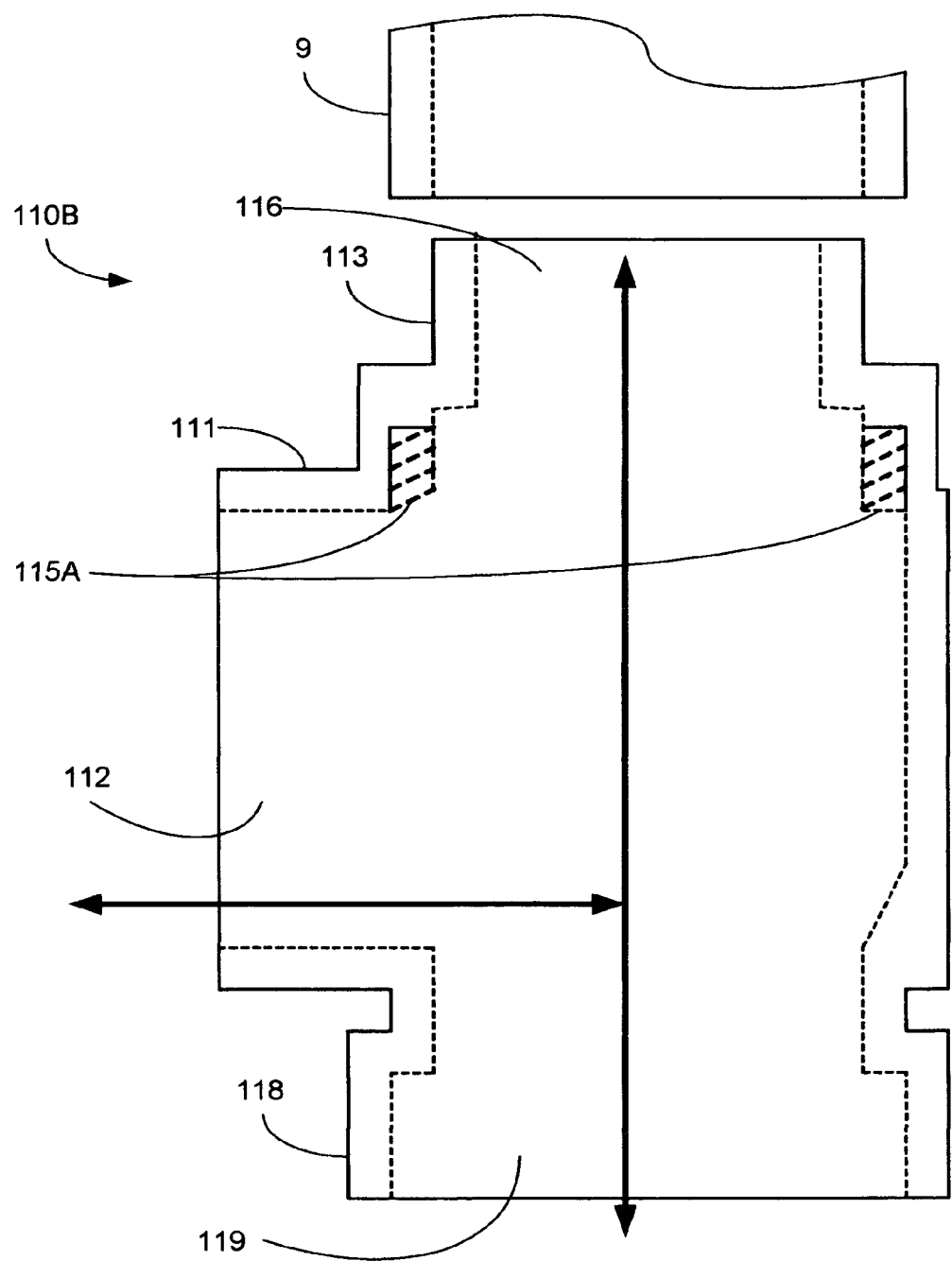
FIG. 7B is a cross-sectional side view illustrating an example of an alternative embodiment of the hub to street test tee with of the present invention, with internal threads on one of the opposing openings that are axially aligned with each other.
Figure 7C:
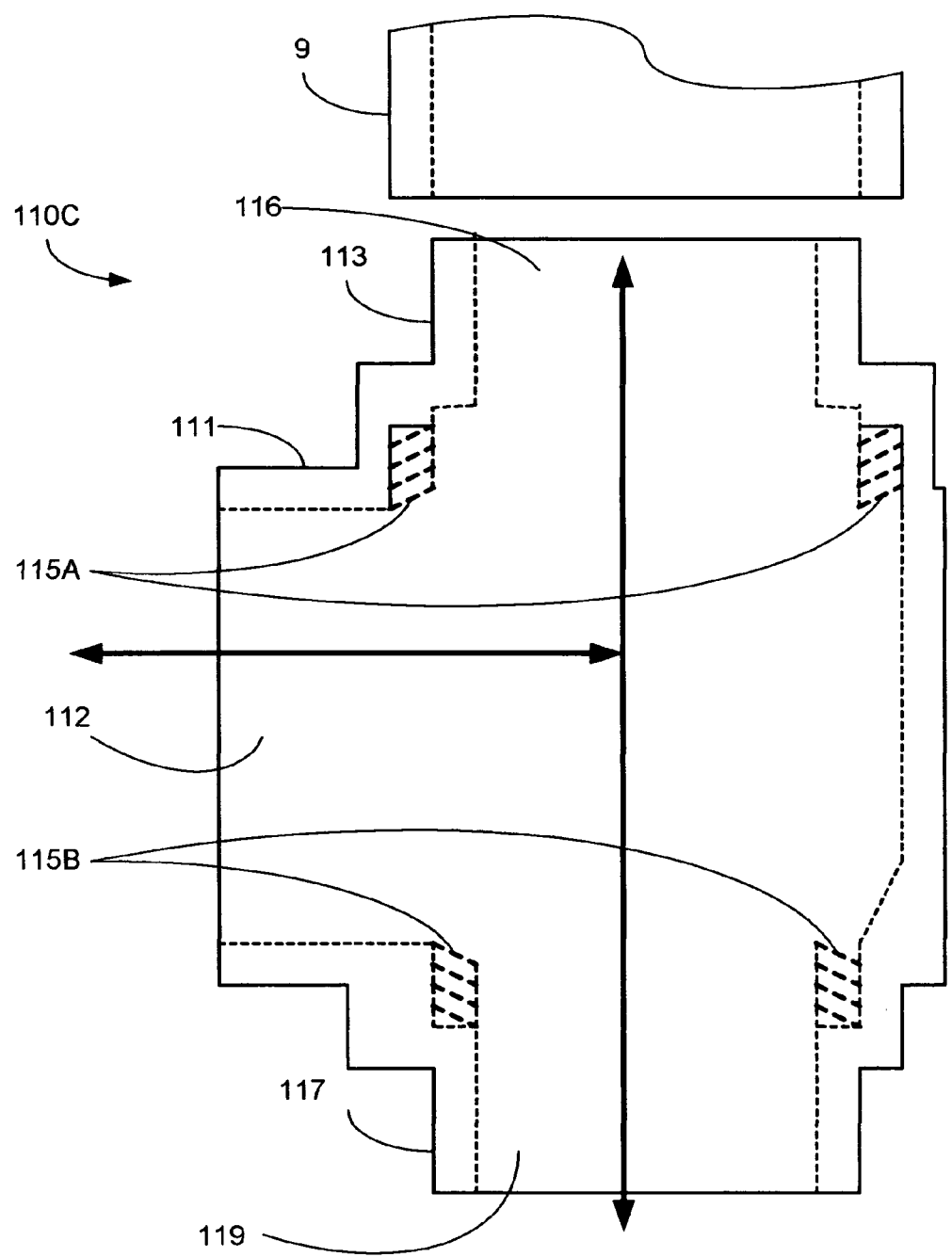
FIG. 7C is a cross-sectional side view illustrating an example of an alternative embodiment of the street to street test tee with of the present invention, with internal threads on both of the opposing openings that are axially aligned with each other.

The alternative embodiment of the test tee of the present invention utilizes a removable threaded blockage device (FIG. 7D) to create blockage for testing purposes. As shown in FIG. 7A, an example of the test tee 110A of the present invention is illustrated a perspective view. In the alternative embodiment, a hub by hub fitting is illustrated, however, it is understood that a street by street or hub by street fitting could also be utilized, as shown in FIGS. 7B and 7C. As shown, test tee 110A of the present invention includes an internal threaded portion 115A. The internal threaded portion 115A enables a removable threaded blockage device 150 (FIG. 7D) to engage the internal threads 115A in the test tee 110A in order to create blockage on one side of the plumbing system.

FIG. 7B is a cross-sectional side view illustrating an example of an alternative embodiment of the hub to street test tee with of the present invention, with internal threads on one of the opposing openings that are axially aligned with each other. As shown in FIG. 7B, hub 114 (FIG. 7A) has been modified to illustrate a street connection 113. The street connection 113 engages the internal diameter of pipe 9 to be affixed to test tee 110B.

FIG. 7C is a cross-sectional side view illustrating an example of an alternative embodiment of the street to street test tee 110C with of the present invention, with internal threads 115A and 115B on both of the opposing openings that are axially aligned with each other. In this an alternative embodiment enables a user to utilize a removable threaded blockage device 150 on both sides of the test tee 110. It should be understood that the hub to hub and hub to street test tees 110 could also utilize the duel internal threads on both of the opposing openings that are axially aligned with the other, as shown here in FIG. 7C.

Figure 7D:
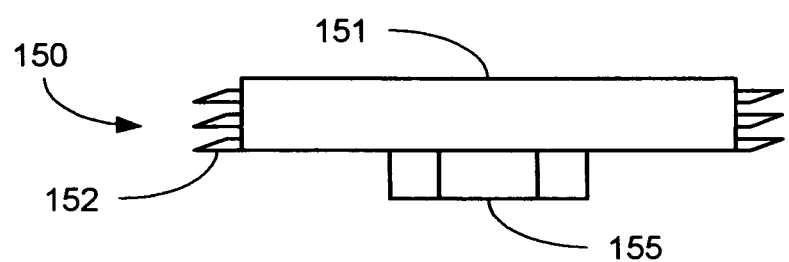
FIG. 7D is a cross-sectional side view illustrating an example of an alternative embodiment of the removable threaded blockage device for a test tee of the present invention.

FIG. 7D is a cross-sectional side view illustrating an example of an alternative embodiment of the removable threaded blockage device 150 for a test tee 110(A-C) of the present invention. The removable threaded blockage device 150 includes circular base plate 151, threading 152 and wrench collar 155. Threading 152 enables the removal threaded blockage device 150 to engage the internal threads 115A of the test tee 110. Wrench collar 155 is illustrated as a hexagon shape, however, it could also be square or some other noncircular shape. The wrench collar 155 enables a user to apply force to tighten the engagement of the removable threaded blockage device 150 with the test tee 110 of the present invention.

In the alternative embodiment, the removable threaded blockage device 150 is molded into a polyvinyl chloride (PVC) using injection molding techniques. The removable threaded blockage device 150 can be constructed from other types of materials such as, but not limited to, galvanized pipe, cast iron, copper, ABS plastic, other plastics, aluminum, tin, copper, steel, rubber or other known plumbing materials.

Figure 7E:
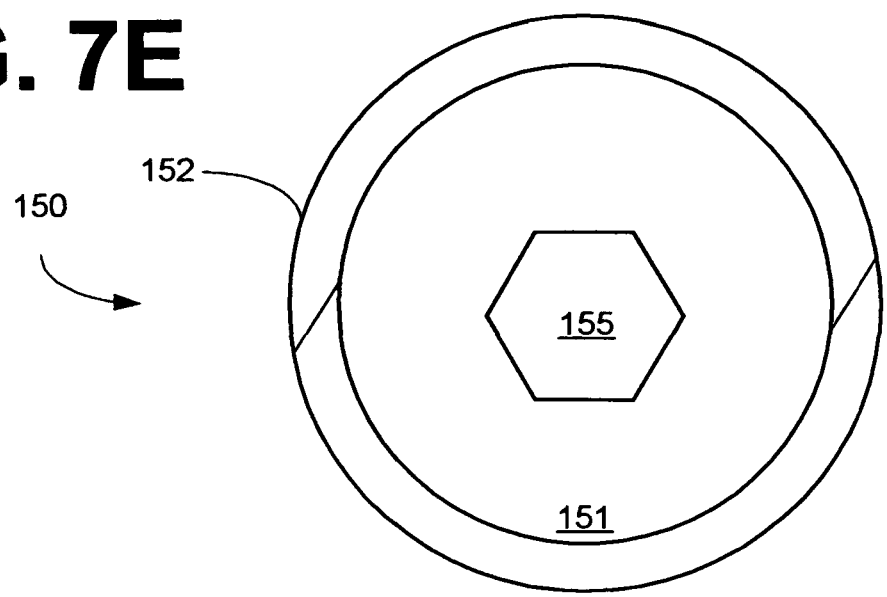
FIG. 7E is a top view illustrating an example of an alternative embodiment of the removable threaded blockage device for a test tee of the present invention.

FIG. 7E is a top view illustrating an example of an alternative embodiment of the removable threaded blockage device 150 for a test tee 110(A-C) of the present invention.

It will be apparent to those skilled in the art that many modifications and variations may be made to embodiments of the present invention, as set forth above, without departing substantially from the principles of the present invention. All such modifications and variations are intended to be included herein within the scope of the present invention, as defined in the claims that follow.

What is claimed is:

1. A test tee device for leak testing a pipe line system, comprising:
    a tee fitting, said tee fitting comprising
        a tubular section extending between a first and a second opposing openings axially aligned with each other;
        a third opening communicating with the tubular section of the tee fitting that is approximately perpendicular to the first and the second opposing openings; and
        wherein said tubular section has a second tubular section having an inside diameter greater than an inside diameter of said first opening and an inside diameter of said second opening; and
        a removable insert attached by anchors within said second tubular section of said test tee to prevent damage to said test tee and to block the flow through said first opening.

2. The test tee device of claim 1, further comprising: wherein the removable insert is a threaded removable insert attached in said tubular section perpendicular to said first opening and blocking the flow through said first opening.

3. The test tee device of claim 1, wherein said removable insert further comprising:
    a pull-tab on said removable insert on a side opposite of said first opening.

4. The test tee device of claim 3, wherein said pull-tab is attached to said removable insert using an attaching means.

5. The test tee device of claim 4, wherein said attaching means comprises a rivet.

6. The test tee device of claim 3, wherein said removable insert is composed of a breakaway material.

7. The test tee device of claim 6, wherein said breakaway material is composed of a malleable metal.

8. The test tee device of claim 6, wherein said breakaway material is composed of a plastic.

9. The test tee device of claim 1, wherein said removable insert further comprises:
    break points to assists in said removable insert removal.

10. The test tee device of claim 1, wherein said anchors do not impede the flow through said first opening.

11. A test tee device for leak testing a pipe line system, comprising:
    a tee fitting, said tee fitting comprising
        a tubular section extending between a first and a second opposing openings axially aligned with each other;
        a third opening communicating with the tubular section of the tee fitting that is approximately perpendicular to the first and the second opposing openings;
        wherein said tubular section has a second tubular section having an inside diameter greater than an inside diameter of said first opening and an inside diameter of said second opening; and
        a threaded removable insert attached by threads within said second tubular section of said test tee to prevent damage to said test tee and to block the flow through said first opening.

12. A method for manufacturing a testing tee, the method comprising:
    providing a test tee, wherein said test tee further comprises a tubular section extending between a first and a second opposing openings axially aligned with each other, a third opening, that is approximately perpendicular to the first and the second opposing openings, communicating with the tubular section of the tee fitting, and a removable insert support hub with anchors in said tubular section;
    providing a removable insert;
    attaching said removable insert to a the support hub in said tubular section perpendicular to said first opening and blocking the flow through said first opening; and
    attaching said support hub to said first opening in said test tee.

13. The method for manufacturing a testing tee of claim 12, wherein said removable insert is composed of a malleable metal.

14. The method for manufacturing a testing tee of claim 12, wherein said removable insert is composed of a plastic.

15. The method for manufacturing a testing tee of claim 12, wherein said anchors do not impede the flow through said first opening.

* * * * *